3,042,706
PROCESS FOR PURIFYING PYRETHRUM EXTRACTS
Joseph Benjamin Haus, East Paterson, N.J., and Robert Wunner Price, Pearl River, N.Y., assignors to S. B. Penick and Company, New York, N.Y., a corporation of Delaware
No Drawing. Filed Jan. 22, 1960, Ser. No. 3,981
11 Claims. (Cl. 260—468)

This invention relates to processes for the preparation of pyrethrum extracts and more particularly to methods of purifying such extracts.

Pyrethrum is one of the oldest and most widely used insecticides mainly because of its rapid knock-down effect on a wide variety of insects and its low degree of toxicity to mammals. Unlike many of the newer synthetic insecticides, pyrethrum does not appear to induce resistance in insects exposed to sub-lethal doses.

Originally, pyrethrum was used as a powder (ground pyrethrum flowers). Now it is more conveniently employed in the form of an extract of the flowers. Such crude extracts or concentrates are easier to standardize and formulate for effective application. Crude concentrates usually assay from 23 to 30 percent pyrethrins and vary in appearance from brownish-black fluids to semi-solids. In addition to the pyrethrins, these concentrates contain large amounts of colored extractives, resins and the like. These impurities are undesirable from a color standpoint. To some extent these impurities precipitate out when the concentrate is diluted with kerosene to usable concentrations; however, the solution remains unstable and further precipitation will occur on standing.

The subject matter herein described and claimed as our invention resides in the concept of a novel process for the purificaton of pyrethrum extracts. In brief, our invention comprises the following steps: extracting the crude pyrethrum extract containing about 20 percent of pyrethrins with an aqueous methyl alcohol mixture containing about 95 percent of the alcohol; separating the alcohol extract layer; removing the methyl alcohol and water by distillation; suspending the resultant residue in a low boiling hydrocarbon solvent such as pentane; separating the insoluble material; removing the hydrocarbon by distillation; and, reconstituting the pyrethrum actives by dissolving the final residue of purified pyrethrin actives in an appropriate final solvent.

The final result of the extraction process of this invention is referred to throughout as pyrethrin actives to distinguish from ordinary pyrethrins. Pyrethrin actives are those pyrethrins which are biologically active as compared to pyrethrins which may be chemically determined but are not cidal in bioassay. Our pyrethrin actives give identical concentrations when determined by both chemical and bioassay means.

It is an object of the present invention to provide light-colored uniform pyrethrum concentrates from which non-staining insecticidal formulations can be made.

It is an object of the present invention to provide a process for the preparation of shelf-stable pyrethrum concentrates.

It is a further object of our invention to remove those non-active impurities which precipitate out on standing and when the concentrates are diluted with kerosene or like solvents.

It is yet another object of our invention to reduce to an acceptable level those insolubles which precipitate out when pyrethrum concentrates are combined with solvents of the fluoro-chloro-aliphatic hydro-carbon type (Freon) commonly used as propellants in aerosol bombs.

It is a further object to provide potentiated and stabilized non-staining pyrethrum extracts.

Additional objects of our inventions will be apparent from the generalized discussion of our process which follows:

We have found that superior results are obtained in our process when the initial crude pyrethrum concentrate is diluted to about 20 percent pyrethrin concentration with kerosene before primary extraction with the aqueous-methyl alcohol solvent. At this dilution, the crude concentrate is considerably less viscous and extraction with the alcohol is greatly facilitated. If the pyrethrin concentration in the crude extract is substantially lowered by the addition of more kerosene, separation of the aqueous methanol layer may be poor and the desired color improvement in the final product consequently is not obtained.

The purpose of the alcoholic extraction step is to recover all of the pyrethrins while excluding as much as the resins, waxes and other colored impurities as possible. We have found that aqueous methyl alcohol, and particularly a solution containing $95 \pm 2.5$ percent of alcohol constitutes a highly desirable extraction system. In addition, decolorization procedures with charcoal are particularly effective in this solvent. In order to demonstrate the criticality of the alcohol concentration, three crude pyrethrum concentrates were extracted with anhydrous, 95 percent and 90 percent methanol respectively. After removal of the solvent from each extract, the residues were made up with kerosene to a calculated 20 percent pyrethrin content and compared. With anhydrous methanol, successive extracts picked up more and more color and the product was not much improved over the starting material. With 90 percent methanol, the product while light in color became turbid at once and solids separated out on standing. But with 95 percent methanol, the product was light in color and showed improved stability; no turbidity being apparent even after several days' storage.

When 95 percent methanol is used as the extraction solvent, the temperature of extraction is not critical and good results are obtained at various extraction temperatures. After extraction, however, the temperature of the system should preferably be lowered to about 20 degrees centigrade, to facilitate separation of the immiscible layers.

Simple decolorization with activated carbon alone is not operative on crude pyrethrum concentrates. It is not possible to remove substantial amounts of impurities from the crude concentrate by this method. The use of activated carbon in the aqueous alcohol extract of the crude concentrate, however, does result in an improvement of color of the product and is a preferred feature of our purification process. Two percent of charcoal is adequate to extract all the charcoal absorbable colorants. The full effect of the charcoal is exerted in 5 minutes. Many decolorizing grades of charcoal will serve. The alcoholic extract solution is filtered to remove suspended matter and decolorizing charcoal, if such is used. Filter aids facilitate this filtration step.

The solvent is removed from the filtrate by distillation beginning at atmospheric pressure and finishing under vacuum. When the pot temperature reaches 75 degrees centigrade at atmospheric pressure, most of the alcohol has been distilled leaving a viscous residue of pyrethrins and water. At this time, the reaction mixture is preferably cooled slightly (to prevent bumping) before completely distilling the remaining alcohol and water under vacuum. This final distillation is achieved at less than 75 degrees centigrade. Such mild conditions prevent undue decomposition of the pyrethrum actives.

The 95 percent methanol extraction selectively removes a substantial amount of the impurities present but the residue still contains inactive materials which separate on aging or dilution with the usual pyrethrin solvents or propellants. We have discovered that dissolving the methanol extract in pentane or other aliphatic hydrocarbons boiling below about 75 degrees centigrade at normal pressures, filtering and distilling off the solvent results in a further improvement of the product. These hydrocarbons may be pure hydrocarbons or mixtures thereof marketed as petroleum distillate fractions. Charcoal may be used as before.

Since we are dealing with a crude botanical product which contains many different impurities of different solubility characteristics, we have discovered that a really efficient purification procedure requires the use of the two solvents. That is to say, separation by the hydrocarbon is necessary for the removal of impurities which by their nature have survived the 95 percent alcohol extraction step. The hydrocarbon extraction is most conveniently accomplished at room temperature and no chilling is required for the separation of impurities. The exact nature of the activated carbons used is not critical to our process and conventional filter aids may be employed in the filtration steps. To prevent possible turbidity due to traces of moisture, a drying agent, such as sodium sulfate, magnesium sulfate or other inorganic solid unreactive to pyrethrum, may be added to the hydrocarbon (pentane) solution and is removed during the final filtration.

It should be noted that reversing the order of solvent extraction steps does not produce a suitable product. The product is then chemically unstable and has appreciably lower "killing power."

On the basis of experimental results, we have determined that the ratio of hydrocarbon to the residue from the alcohol extraction should be at least about 5 parts by weight of hydrocarbon to one part of the alcoholic extract distillation-residue, with optimum products resulting when the ratio is greater than 9 to 1.

After filtration the hydrocarbon is removed by distillation, with or without vacuum. The residue, which is the pyrethrin actives of this invention, is then dissolved in a solvent. The pyrethrin actives may be dissolved directly in propellants when their use in aerosol bombs is intended, although the common practice in the industry is to prepare stock concentrates in appropriate solvents. Such solvents, include kerosene, methylated napthalene, acetone, methylene chloride, etc. as well as the fluorochlorohydrocarbons and the other commonly used propellants. Dissolving the purified pyrethrin actives, prepared as described above, in any appropriate solvent falls within the broad scope of our invention, as does the adsorption of the almost colorless liquid actives upon inert powder carriers.

We have found it advantageous to add stabilizers to the solutions and dilutions of the pyrethrum actives if such dilutions are to be stored for any length of time exposed to light, air or metals. Such stabilizers should preferably be anti-oxidants and include such commonly used materials as "Catalin Antioxidant AC-1" (2,6-ditertiary-butyl-para-cresol), "Tenox BHA" (butylated hydroxy anisole), hydroquinone, propyl gallate and others. We have found, in addition, that certain synergists especially Sulfoxide (N-octyl sulfoxide of isosafrole) stabilize the "pyrethrin actives" during periods of storage. Stabilizing the pyrethrin actives solutions for long periods of time, does not interfere with the characteristic synergistic activity of Sulfoxide. It should be noted that crude pyrethrum is not substantially improved in stability by the addition of the Sulfoxide.

In general, stock solutions of the pyrethrin actives of this invention have formulations in the ranges listed below:

| Ingredient: | Percentage range |
|---|---|
| Pyrethrin actives | 1–40 |
| Anti-oxidant | 0–2 |
| Synergist | 0–95 |
| Solvent | 0–97 |

As mentioned above, the synergist may replace all of the solvent and can obviate the need for anti-oxidant additives. The preferred proportions of synergist and pyrethrin actives in finished products is approximately 8:1. However, synergistic effects are noted in proportions ranging from 20:1 to 1:20. The stock solutions preferably should contain such ratios of actives and synergists.

Commercial insecticides should contain at least 0.05 percent of actives and the preferred concentration range of pyrethrin actives in bombs is in the range of 0.01 to 0.5 percent by weight. The lower portions of this range are adequate where the action of the pyrethrins is potentiated by synergists. The concentrates above may also be combined with other insecticides such as DDT and Methoxychlor.

Our complete process is illustrated by the following examples, but it should be noted that these illustrate only a small portion of the possible variations within the scope of our invention.

EXAMPLE I

To 200 grams of a crude pyrethrum extract or concentrate assaying 23.62 percent total pyrethrins, there was added 40 grams of kerosene. The diluted crude concentrate was then extracted with three successive portions of 95 percent aqueous methyl alcohol. The first portion was 1000 grams and the second and third portions were 500 grams each. After each extraction, the system was cooled to 15 to 20 degrees centigrade to promote separation of the two liquid phases. The three separated alcohol extracts were combined and 20 grams of decolorizing carbon and an equal weight of filter aid were added. After mixing well at room temperature, the mixture was filtered and the filter cake washed with a small portion of 95 percent methanol. The combined filtrates were distilled to a temperature of about 75 degrees centigrade at atmospheric pressure and finally at 70 degrees centigrade and 20 millimeters of mercury pressure until all the methanol and water had been removed. The residue at this point was a clear brown viscous liquid weighing 70 grams. After the residue had been suspended in 1000 grams of pentane, 24 grams of anhydrous sodium sulfate, 10 grams of decolorizing charcoal and 10 grams of filter aid were added with stirring. After standing overnight, the reaction mixture was filtered and the filter cake washed with a small amount of pentane. The combined pentane filtrates were distilled at 35 to 50 degrees centigrade at atmospheric pressure and finally at 20 millimeters at 50 degrees centigrade to remove the last traces of pentane. To the 66 grams of pyrethrin actives were added with stirring 170.2 grams of kerosene. After a final filtration, the clear yellow solution assayed for 20 percent pyrethrins indicating essentially a complete recovery of all the pyrethrin biologically active values initially present in the crude concentrate.

EXAMPLE II

This example illustrates the use of our process on a larger scale. A crude concentrate assaying 26.7 percent pyrethrins was put through a pilot plant run using essentially the same procedure as in the previous example but with correspondingly larger amounts of reagents. Starting with 125 pounds of crude extract, the recovery was 31.9 pounds of actives or 95.5 percent based on the 33.4 pounds of pyrethrins initially present. (A total of 99.7 percent of the pyrethrins can be accounted for if the 76 pounds of alcohol-extracted residues assaying 1.92 percent pyrethrins are considered.)

EXAMPLE III

To 200 grams of the crude pyrethrin extract that was the starting material of Example I, was added 40 grams of kerosene. The diluted crude concentrate was then extracted with 2000 grams of 95 percent aqueous methanol in three successive portions of 1000, 500, and 500 grams.

Each extract was separated from the kerosene layer and the combined alcoholic extracts were filtered and distilled as in Example I.

This clear light brown extract was suspended in 1000 grams of a commercial aliphatic hydrocarbon solvent (boiling below 75 degrees centigrade) allowed to stand for 4 hours, filtered and the hydrocarbon distilled off. The straw-colored residue showed 97 percent recovery of pyrethrin actives.

A stock solution having the following formula was prepared:

| | Percent |
|---|---|
| Pyrethrin actives | 5 |
| Tenox BHA (antioxidant) | 1.5 |
| Methylated napthlene | 50 |
| Kerosene q.s. ad total 100 percent. | |

To test stability, a portion of stock solution was stored at room temperature and another at 50 degrees centigrade for six weeks. Aerosol bombs were prepared from each portion in the following formulation:

| | Percent |
|---|---|
| Stock solution | 5 |
| Petroleum distillate | 10 |
| Propellant (Freons 11 and 12, 1:1) | 85 |

The bombs prepared with the pyrethrin actives stored at both temperatures gave identical results in the Peet-Grady test, which results were equivalent to those obtained with the Official Test Aerosol (OTA).

EXAMPLE IV

Sixty-five grams of pyrethrin actives prepared according to the method of Example III were mixed with 520 grams of Sulfoxide. The mixture was divided into portions which were stored as indicated in Example III for six weeks. Aerosol bombs were prepared from this concentrate (1:8) having the following formulation:

| | Percent |
|---|---|
| Pyrethrin actives | 0.25 |
| Sulfoxide | 2.00 |
| Methylated napthalene | 12.75 |
| Propellant | 85.00 |

Under standard testing conditions of 3.0 grams per 1000 cubic feet, the incubated sample showed a 15 minute "Aerosol Test Knockdown" of over 95 percent, an "Aerosol Knockdown Mortality" of 95 percent and a total "Aerosol Test Mortality" of over 96 percent. The samples stored at room temperature gave similar results indicating the excellent stability of the pyrethrin actives synergized and stabilized with the Sulfoxide as well as the potency of the combination.

Purified pyrethrum concentrates prepared by the process outlined in our discussion and further described in the example above were tested and evaluated according to the objectives stated earlier in our introduction:

Seventeen consecutive batches of process pyrethrin actives solutions adjusted to contain about 23.0 percent pyrethrins, were measured for percent light transmission using a Klett-Summerson Photoelectric Colorimeter and a B-530 filter. The average transmission was 49.4 percent with an average deviation of only 8.7. The color of these concentrates can be described as being a clear light amber, approximating No. 11 on the Gardner Scale (Method 4248, May 15, 1958; Fed. Inst. Method Std. No. 141). The color of the unpurified crudes can be described as dark brown to almost black solutions or semi-solids.

Staining tests were run according to Federal Specification OP-921a, June 11, 1953, Sect. 4.4.6. Solutions containing approximately 0.2 percent pyrethrin actives were prepared by diluting 0.1 milliliter of the above concentrate to 10 milliliters with colorless kerosene. Application of the entire volume of dilute solution to unsized white cotton cloth or to white filter paper showed no colored or oily stain after evaporation. Additional tests were run with aerosol formulations containing 0.5 percent pyrethrins. Direct spraying of white filter paper left no detectable stain.

Three different lots of pyrethrum extract were tested for insolubles in dichlorodifluoromethane, according to Federal Specifications O-P-921a, page 5, paragraph 4.4.7 before and after purification by our process. The results are tabulated in the following table:

*Percent Dichlorodifluoromethane Insolubles*

| Lot | Before Purification | After Purification |
|---|---|---|
| 1 | 4.21 | 0.82 |
| 2 | 4.73 | 0.86 |
| 3 | 5.79 | 1.20 |

All three of these lots after purification, pass Federal Specifications (loc. cit.) which specify maximum insolubles of 1.5 percent for pyrethrum extracts suitable for the compounding of aerosol insecticides.

Purified pyrethrum prepared by our process do not separate undesirable insolubles when aged in solution in a typical aerosol propellent solvent. Several lots of purified concentrates were tested in the following way: One gram of pyrethrin actives was dissolved in 14 grams of deodorized kerosene and the solution added to 85 grams of trichlorofluoromethane (Freon 11) in an aerosol can. The cans were sealed and placed in an oven at 50 degrees centigrade (120 degrees Fahrenheit). After six months, several cans were opened and the contents examined. In all cases, the solutions were clear and showed no sign of precipitation. Moreover, the interior of the cans showed no sign of corrosion.

Having described and illustrated our invention and certain of the beneficial uses thereof, we claim:

1. The process for purifying crude pyrethrum extracts which comprises mixing a crude extract containing pyrethrins with about 95 percent aqueous methyl alcohol, separating the alcohol layer, removing therefrom methyl alcohol and water by distillation below 75 degrees centigrade, suspending the resultant residue in a low boiling saturated aliphatic hydrocarbon, separating the insoluble material, removing the hydrocarbon by distillation and reconstituting the pyrethrum extract by dissolving the final residue of pyrethrin actives in an organic solvent.

2. The process according to claim 1 wherein the solvent is kerosene.

3. The process for purifying crude pyrethrum extracts which comprises mixing a crude extract containing about 20 percent of pyrethrins with about 95 percent aqueous methyl alcohol, separating the alcohol layer at about 15 to 20 degrees centigrade, removing methyl alcohol and water by distillation below 75 degrees centigrade, suspending the resultant residue in at least 5 times its weight of pentane separating the insoluble material, removing the pentane by distillation and reconstituting the pyrethrum extract by dissolving the final residue of purified pyrethrin actives in an organic solvent.

4. The process according to claim 3 wherein the solvent is kerosene.

5. The process according to claim 3 wherein the solvent is the N-octyl sulfoxide of isosafrole.

6. The process for concentrating pyrethrin actives from crude pyrethrum extracts which comprises mixing a crude extract containing about 20 percent pyrethrins with aqueous alcohol solutions containing substantially 95 percent methyl alcohol, separating the alcoholic layer, removing the insoluble matter, distilling off the methyl alcohol and water at temperatures below 75 degrees centigrade, mixing the resultant residue with a saturated aliphatic hydrocarbon boiling below 75 degrees centigrade removing the insoluble material, removing the hydrocarbon by distillation and diluting the pyrethrin actives recovered in an organic solvent therefor.

7. The process according to claim 6 wherein the diluent contains pyrethrin stabilizing factors.

8. The process according to claim 6 wherein the solvent for the pyrethrin actives includes an amount of sulfoxide at least equal in weight to the weight of the actives.

9. The process for purifying crude pyrethrum concentrates which comprises providing a crude concentrate containing about 20 percent of pyrethrins therein, repeatedly extracting said concentrate with fresh portions of 95 percent aqueous methyl alcohol, combining the alcoholic extracts, adding decolorizing charcoal to the combined extracts, separating the insoluble material therefrom, removing methyl alcohol and water by distillation below 75 degrees centigrade, suspending the resultant residue in at least five times its weight of pentane containing decolorizing charcoal and an inorganic drying agent, separating the insoluble material, removing the pentane by distillation and reconstituting the pyrethrum extract by dissolving the final residue of purified pyrethrin actives in an organic solvent.

10. The process for purifying crude pyrethrum concentrates which comprises providing a crude concentrate containing about 20 percent of pyrethrins therein, extracting said concentrate with three portions of 95 percent aqueous methyl alcohol, separating the alcoholic layer at about 15 to 20 degrees centigrade after each extraction, combining the alcoholic extracts, adding decolorizing charcoal to the combined extracts, separating the insoluble material therefrom, removing methyl alcohol and water by distillation below 75 degrees centigrade, suspending the resultant residue in at least five times its weight of pentane containing decolorizing charcoal and sodium sulfate, separating the insoluble material, removing the pentane by distillation and preparing a pyrethrum concentrate by dissolving the final residue of purified pyrethrin actives in a stabilizing solvent therefor.

11. The process for purifying the pyrethrins in a crude pyrethrum extract which comprises contacting a crude extract of pyrethrums containing about 20 percent of pyrethrins with 95 percent aqueous methyl alcohol, separating the alcohol layer at about 15 to 20 degrees centigrade, adding thereto decolorizing charcoal, separating the insoluble material therefrom, removing methyl alcohol and water by distillation below 75 degrees centigrade, suspending the resultant residue in at least five times its weight of pentane containing decolorizing charcoal, separating the insoluble material and removing the pentane by distillation leaving the purified pyrethrin actives as the final residue.

References Cited in the file of this patent

UNITED STATES PATENTS 2,372,183　　Barthel et al. _____ Mar. 27, 1945

FOREIGN PATENTS 493,074　　Great Britain _____ Oct. 3, 1938
702,886　　Great Britain _____ Jan. 27, 1954